US006957301B2

(12) United States Patent
Deenadhayalan et al.

(10) Patent No.: US 6,957,301 B2
(45) Date of Patent: Oct. 18, 2005

(54) SYSTEM AND METHOD FOR DETECTING DATA INTEGRITY PROBLEMS ON A DATA STORAGE DEVICE

(75) Inventors: Veera W. Deenadhayalan, Fremont, CA (US); Mark A. Johnson, Rochester, MN (US); Carlos Querol, Rochester, MN (US); Michael Roble, Mazeppa, MN (US); Mohan Rowlands, Union City, CA (US)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 10/247,005

(22) Filed: Sep. 18, 2002

(65) Prior Publication Data

US 2004/0054849 A1 Mar. 18, 2004

(51) Int. Cl.[7] .............................................. G06F 12/00
(52) U.S. Cl. ........................... 711/112; 711/154; 714/42
(58) Field of Search ................................. 711/154, 112, 711/114; 714/42

(56) References Cited

U.S. PATENT DOCUMENTS

| | | | | |
|---|---|---|---|---|
| 5,862,312 A | * | 1/1999 | Mann et al. ................... | 714/6 |
| 5,864,655 A | | 1/1999 | Dewey et al. | |
| 5,875,457 A | | 2/1999 | Shalit | |
| 5,913,927 A | | 6/1999 | Nagaraj et al. | |
| 5,953,352 A | | 9/1999 | Meyer | |
| 5,991,852 A | * | 11/1999 | Bagley ........................ | 711/112 |
| 6,058,455 A | | 5/2000 | Islam et al. | |
| 6,151,659 A | * | 11/2000 | Solomon et al. ............ | 711/114 |
| 6,161,192 A | | 12/2000 | Lubbers et al. | |
| 6,230,190 B1 | | 5/2001 | Edmonds et al. | |
| 6,243,827 B1 | | 6/2001 | Renner, Jr. | |
| 6,247,099 B1 | | 6/2001 | Skazinski et al. | |
| 6,256,740 B1 | | 7/2001 | Muller et al. | |
| 6,282,619 B1 | | 8/2001 | Islam et al. | |
| 6,282,670 B1 | | 8/2001 | Islam et al. | |
| 2001/0007102 A1 | | 7/2001 | Gagne et al. | |

OTHER PUBLICATIONS

Architecture of a fault–tolerant RAID–5+I/O subsystem□□Jaffe, D.H.; MTI RAID Technol. Center, Sunnyvale, CA, USA; System Sciences, 1993, Proceeding of the Twenty–Sixth Hawaii International Conference on; Jan. 5–8, 1993, pp. 60–69 vol. 1.*

* cited by examiner

Primary Examiner—Brian R. Peugh
(74) Attorney, Agent, or Firm—Arthur J. Samodovitz (57) ABSTRACT

A storage controller and associated disk or disk portion where after the controller terminates its access to said disk or disk portion, data integrity problems in the disk or disk portion can be detected. Before host data associated with a write command is written from the cache memory to the disk or disk portion, an identity of the storage controller as a current user of the disk or disk portion and indication that the controller is operating in a mode it stores data in a cache is recorded on the disk or disk portion. If the storage controller is shut down abnormally, the record of the identity of the controller and the indication are not cleared. The storage controller is restarted or rebooted and the record is read to learn that the controller was using the disk or disk portion and operating in the foregoing mode before the shutdown.

9 Claims, 6 Drawing Sheets

SYSTEM AND METHOD FOR DETECTING DATA INTEGRITY PROBLEMS ON A DATA STORAGE DEVICE

The invention relates generally to data storage controllers and data storage devices, and deals more particularly with detecting data integrity problems in data stored on a disk.

Host computers may store data in external storage devices. Typically, the storage device has two components—a storage medium such as a magnetic disk and a drive to physically access the disk. In the case of a disk drive, there may also be a storage controller interposed between the host computer and the storage device. The storage controller instructs the disk drive where to store and access data on the disk. The storage controller may receive I/O commands from one or more of the host computer which are local or remote (via a network). It is important that the data storage arrangement be reliable, and if there is a failure of a storage medium, a disk drive, a storage controller or the communication between the storage controller and the disk drive, that the data can be recovered. There are several, well known "RAID" architectures for ensuring reliability and recovery. These architectures provide redundancy of data on the same or different disks, distribution of data across the same or different disks, parity bits on the same or different disks as the data, redundancy of controllers for each disk drive, redundancy of communication paths between the storage controllers and the disk drives, etc. Generally, the higher the RAID level, the greater the degree of redundancy, amount of parity bits, distribution of data and parity bits, etc. This results in greater reliability and recoverability. Currently, there are six RAID levels, RAID 0–5. These are described in "A Case for Redundant Array of Inexpensive Disks", Proceedings of ACM SIGMOD, June 1988 by Patterson et al.

Each storage controller can be connected to multiple disk drives for greater reliability/recovery as noted above, and to increase storage capacity. Likewise, there can be multiple storage controllers available to each host, each storage controller with access to multiple disk drives. These provide redundancy as noted above and greater capacity to handle I/O requests from the host(s).

When one or more hosts make write requests to a storage controller, the storage controller may initially write the host data to a cache within the storage controller, instead of writing each item of data immediately out to the disk drive. Each item of host data is not immediately written to the disk drive because of the time and resources required to perform this I/O operation. Periodically, when the cache is nearly full, when the storage controller is being shut down, when a host requests a change in "ownership" of a disk drive, or upon some other event, the storage controller writes the contents of its cache out to the appropriate disk drive(s). A problem occurs when a disk is transported before all the updates from the storage controller cache intended for this disk have been written to the disk. This can occur if the storage controller is not shut down properly or fails before the disk is transported. (It can also occur if there is a failure in the disk drive, but then the storage device is not usable anyway.) Not only is the data in the disk stale, but the next user of the disk will not know that the data is stale or which storage controller has the updates in its cache.

Accordingly, a general object of the present invention is to detect data integrity problems in a disk that has been transported.

Another object of the present invention is to facilitate the update of a transported disk with the latest updates.

SUMMARY OF THE INVENTION

The invention resides in a method for operating a storage controller and associated disk or disk portion such that after the storage controller terminates its access to said disk or disk portion, data integrity problems in the disk or disk portion can be detected. The storage controller is coupled to one or more host computers to receive write commands to write host data onto the disk or disk portion. The storage controller receives a write command from the host and writes host data associated with the write command into a cache memory in the storage controller. Before the host data is written from the cache memory to the disk or disk portion, the following is recorded on the disk or disk portion—an identity of the storage controller as a current user of the disk or disk portion and an indication that the storage controller is operating in a mode in which it stores data in a cache before writing the data to the disk or disk portion. Subsequently, the storage controller is shut down abnormally such that contents of the cache memory are not written to the disk or disk portion. Also, the record of the identity of the storage controller and the indication that the storage controller is operating in the foregoing mode are not cleared. Subsequently, the storage controller is restarted or rebooted and the record is read to learn that the storage controller was using the disk or disk portion and operating in the foregoing mode before the shutdown. This record reveals possible data integrity problems.

According to another feature of the present invention, if another storage controller accesses the disk after the first storage controller shuts down abnormally, the other storage controller will also learn that there may be data integrity problems on the disk or disk portion.

According to another feature of the present invention, the record of the mode of operation of the storage controller is not updated upon each write to the cache memory or upon each write from the cache memory to the disk or disk portion.

DETAILED DESCRIPTION OF THE PREFERRED EMBODIMENTS

Figure 1:
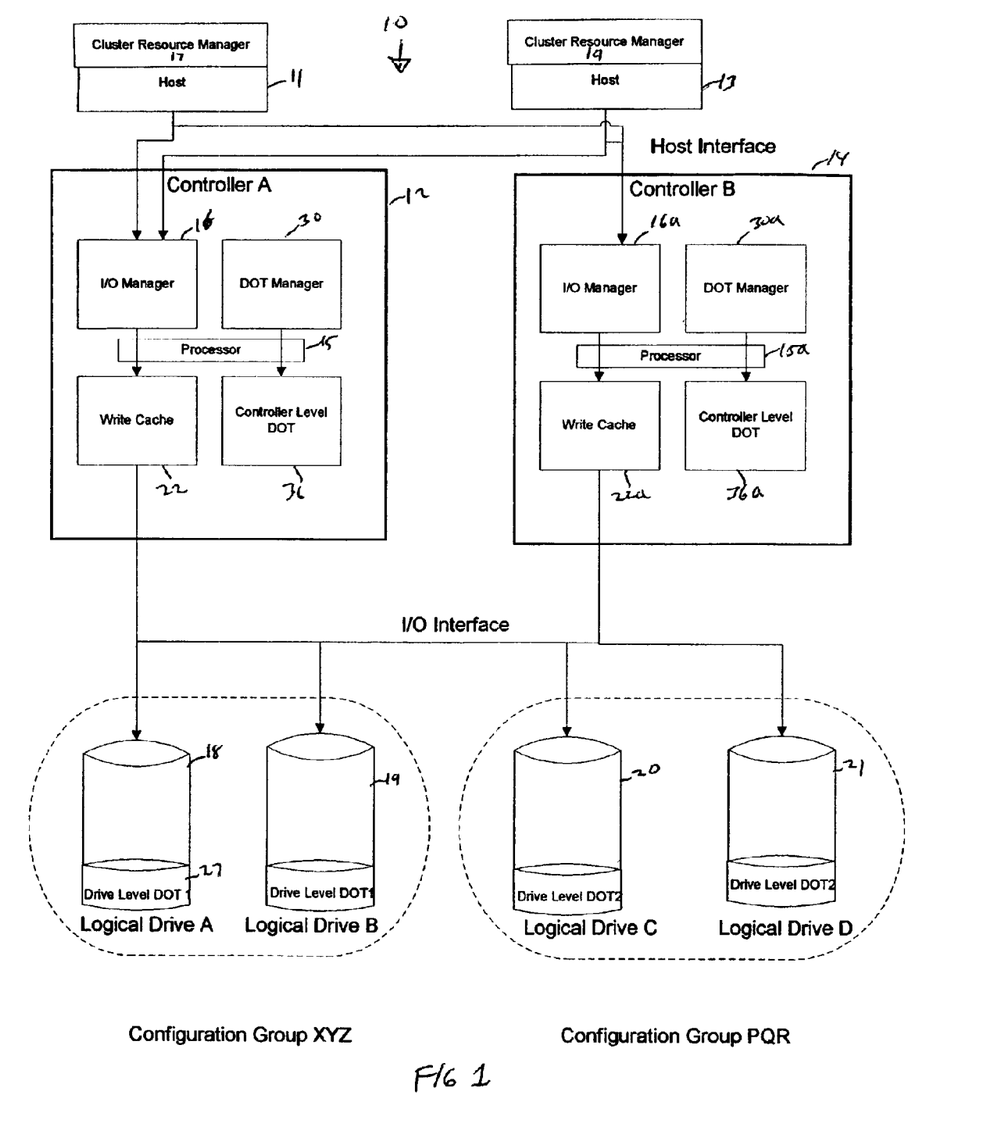
FIG. 1 is a block diagram of a system of storage controllers and storage devices embodying the present invention.

Referring now to the drawings in detail wherein like elements indicate like components throughout the drawings, FIG. 1 illustrates a system generally designated 10 according to the present invention. System 10 comprises storage controllers 12 and 14, each coupled to host computers 11 and 13 through a known interface such as PCI-X. Each storage controller includes hardware and firmware that implement various RAID functions such as creating parity bits, distributing data across one or more disks, duplicating data etc. Each storage controller also has a unique worldwide ID. The worldwide ID is used by the hosts to address I/O commands to a specific storage controller. The worldwide ID is also used by the storage controllers to record in tables in the storage controller and in storage devices which storage controller currently "owns" each logical drive of a storage device. A "logical" drive is one or more physical drives logically combined to form one drive addressable by the storage controller. A "logical" drive can store a multitude of blocks of data for a multitude of write commands issued by a host. As explained in more detail below, the "owner" has the right to update data on the logical drive and may have data updates in its cache memory awaiting an appropriate time to write them to the disk drive. Storage controller 12 includes a processor 15 which executes the firmware and software functions within storage controller 12. Storage controller 12 includes an I/O manager 16 in the form of firmware that handles read requests from hosts 11 and 13 for data stored on storage devices 18–20. The I/O manager determines which physical drive within the logical drive contains the data sought to be read, converts the read request to a format suitable for the disk drives, etc. I/O manager also handles write request from host 11 and 13 to write host data onto storage devices 18–20. The I/O manager determines which physical drive contains the address sought to be written, converts the write request to a format suitable for the disk drives, etc. By way of example, the interface between the storage controllers and the disk drives is SCSI or Fibre Channel. Storage controller 12 also includes a write cache 22 which preferably is semiconductor memory. Ideally, there is a battery backup, not shown, to safeguard the data in the write cache in the event of a power outage. Write cache 22 is closely coupled to processor 15 such that little processor overhead is consumed by processor 15 in writing to or reading from cache 22. Preferably, cache 22 is directly addressable by processor 15. Cache 22 is used by storage controller 12 to collect host data updates until an appropriate time to write them to a storage device. Cache 22 is considered "dirty" when it contains data that has not yet been written to the external storage device.

Hosts 11 and 13 include Cluster Resource Manager programs 17 and 19 respectively which communicate with each other to control "ownership" of the logical drives so that only one storage controller can use a particular logical drive at any one time. Cluster Resource Manager programs avoid the situation where two storage controllers attempt to use the logical drive at the same time. Some examples of Cluster Resource Manager programs are IBM/Mylex PathPilot program, Microsoft WolfPack program, Novell Wolf Mountain program or Novell Advanced Distributed Clustering program.

As explained in more detail below, each logical drive 18–20 includes on its respective physical disks a Drive Level Drive Owner Table ("Drive Level DOT") which includes the worldwide ID of the current owner of the each logical drive of the configuration group. A configuration group is a set of associated physical drives which have one or more logical drives defined. The Drive Level DOT records the owner information per logical drive because that is an operative level of granularity. In addition, the Drive Owner DOT includes a simple "in use" bit to indicate whether there is a current owner. The simple "in use" bit is provided, even though it is inherent to the worldwide ID record, because it suffices for some inquiries and is simpler to access than the many bits of the world wide ID. The Drive Level DOT also records whether or not the logical drive is "dirty", i.e. whether there is data in the owner's cache yet to be written to the logical drive. The following is an example of a Drive Level DOT for configuration group XYZ:

| Logical Drive | Owner | In Use | Dirty |
|---|---|---|---|
| A | WWID SC 12 | Yes | Yes |
| B | WWID SC 14 | Yes | Yes |

This "dirty" bit will be set when a storage controller operating in the write back/cache mode assumes ownership of the logical drive. In the illustrated embodiment, the "dirty" bit will not be reset every time the cached data for the logical drive is written to the logical drive. The "dirty" bit will be reset when the storage controller terminates its ownership of the logical drive or shuts down normally, in which case, the owning storage controller's cache is flushed. If the "dirty" bit is not set for a particular logical drive, then there is no cache data yet to be written to this logical drive from the owner. Conversely, if the "dirty" bit is set, it does not necessarily mean that there is cache data yet to be written to the logical drive. The contents in the Drive Level DOT enables a controller which intends to access a logical drive to determine whether the disk drive has been transported from another controller, operating in the write-back mode, before this other controller has been properly shut down. "Proper shut down" of a storage controller includes the writing of all data from its cache memory to the appropriate disk so that the disk data is up to date. Thus, the Drive Level DOT indicates whether the disk may be missing updates from a cache of the owning or another storage controller.

Storage controller 12 also includes a Controller Level DOT which is a table that records which logical drives are currently owned by storage controller 12 and the other storage controllers that have shared access to the same logical drives as storage controller 12. Thus, for each logical drive is the world wide ID of the storage controller that currently owns it. Controller Level DOT also indicates whether each of these logical drives owned by storage controller 12 is "in use" or "dirty". As in the Drive Level Dot, the "in use" bit in the Controller Level DOT is a simplified form of the world wide ID entry. Also, as in the Drive Level DOT, the "dirty" bit in the Controller Level DOT is set when a first write command is received and the storage controller is set in the write back mode for this logical drive. In the illustrated embodiment, the "dirty" bit is not reset after each writing of the cache to the logical drive. The "dirty" bit is reset when the storage controller relinquishes its ownership of the logical drive or changes to the write through mode or is shut down. The following is an example of a Controller Level DOT:

| Logical Drive | Owner | In Use | Dirty |
|---|---|---|---|
| A | WWID SC 12 | Yes | Yes |

-continued

| Logical Drive | Owner     | In Use | Dirty |
|---------------|-----------|--------|-------|
| B             | WWID SC 14 | Yes    | Yes   |
| C             | WWID SC 12 | Yes    | No    |
| D             | WWID SC 14 | Yes    | Yes   |

Storage controller 12 includes a DOT Manager 30 which updates the Drive Level DOTs accessible by storage controller 12 and maintains the Controller Level DOT 36. The DOT Manager 30 also determines, during rebooting, if a storage device connected to the storage controller 12 has been transported before all storage controllers sharing access to the storage device were properly shut down. If so, then DOT Manager 30 will prepare to run a consistency check to validate the parity on the affected logical drives. This consistency check will not be run if the original owner rejoins the cluster. The consistency check will execute if writes are issued to the logical drive by storage controller 12. The consistency check will also execute if the original owner does not rejoin the cluster by a specified time. Storage controller 14 includes the functions and features labeled 16a, 15a, 22a, 30a and 36a which are the same as those labeled 16, 15, 22, 30 and 36, respectively, in storage controller 12.

Figure 2:
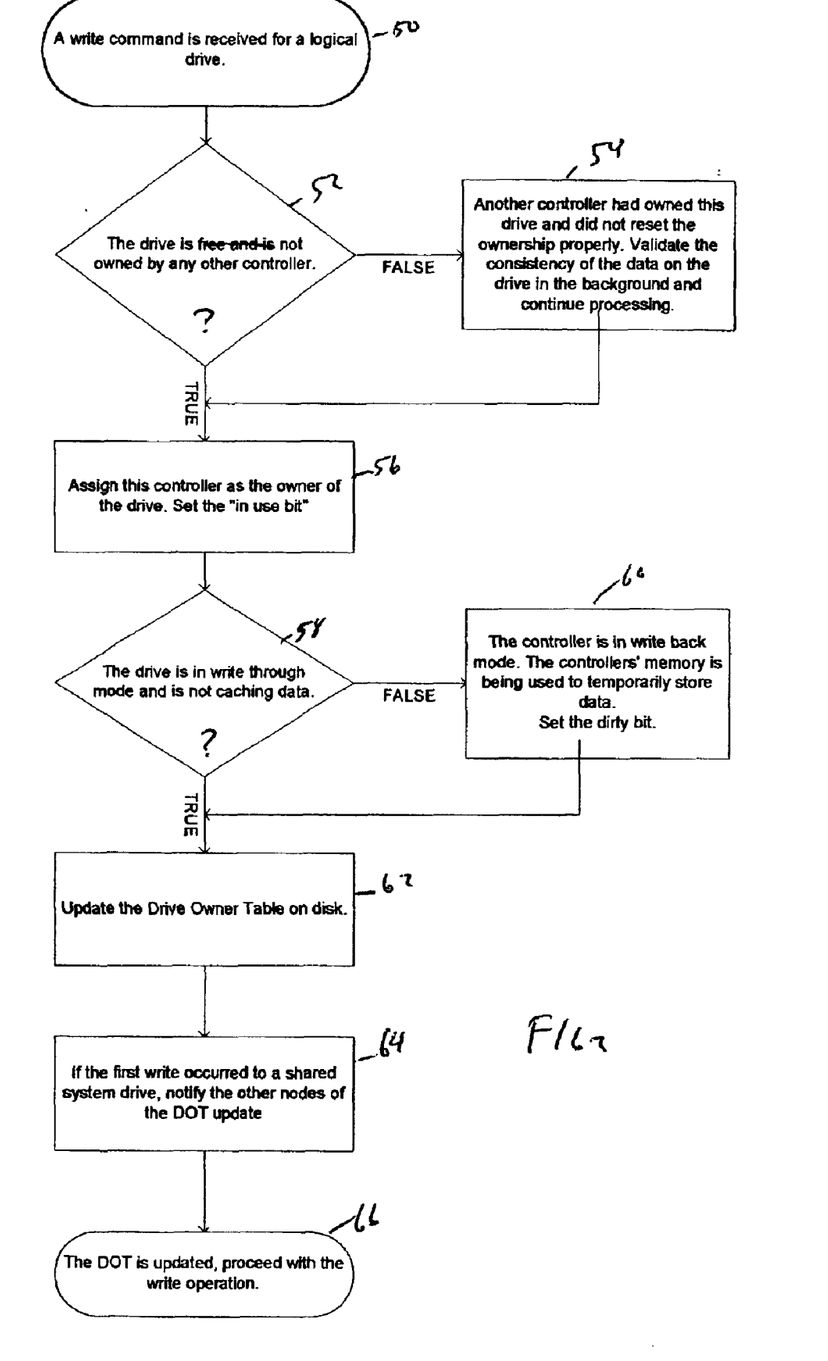
FIG. 2 is flow chart illustrating processing by each storage controller of FIG. 1 to initialize Drive Owner Tables, according to the present invention.

FIG. 2 is a flow chart illustrating processing by DOT Manager 30 in response to a first write command by a host for a logical drive. The processing of FIG. 2 occurs after storage controller 12 has been booted up and allowed to own the logical drive, and does not reflect existing data integrity problems on the logical drive. (That will be described later with reference to FIG. 7.) As explained above, the Cluster Resource Manager programs 17 and 19 ensures that only one storage controller at a time can own/use a logical drive. In step 50, DOT Manager 30 receives a notification from I/O Manager 16 that storage controller 12 has received a write command from one of the hosts. DOT Manager 30 also learns from I/O Manager 16 the identity of the physical drive to which the data should eventually be written, for example, a physical drive on logical device 18. I/O Manager 16 will delay processing of the write command until the DOT Manager 30 completes the following processing of the Controller Level DOT 36 and Drive Level DOT 27. In response to the notification of the write command, DOT Manager 30 determines if the logical drive is currently owned by another storage controller by checking the Controller Level DOT 36 (Step 52). As explained above, this should not generally be the case, except for the following scenario. When each storage controller assumes ownership of a logical drive, it notifies the other storage controllers that share access to this logical drive that it currently has ownership. In response, these other storage controllers update their Controller Level DOT to include the worldwide ID of the owner and sets the "in use" bit. These other storage controllers will also set the "dirty" bit if the "dirty" bit is set in the Controller Level DOT of the owner, such that the Controller Level DOTs are the same for all the storage controllers with shared access to the logical drive. (The information indicating which storage controllers share access to each logical drive is contained in configuration information supplied to each storage controller during boot up and thereafter, if changed.) Likewise, when an owner of a logical drive terminates its ownership, it should notify the other storage controllers to delete reference to the previous owner in their Controller Level DOTs. However, in the case of step 54, the previous owner of the logical drive may not have notified the other storage controllers to reset/clear the ownership information in their Controller Level DOTs for the logical drive. So, if the Controller Level DOT 36 indicates that another storage controller such as 14 currently owns the logical drive, then storage controller 12 asks storage controller 14 if it currently owns this logical drive or has data in its write cache yet to be written to the logical drive. If storage controller 14 is down, then storage controller 12 will check parity of the data in the logical drive and take ownership of the logical drive. If storage controller 14 comes up later and has updates yet to be written to the logical drive, then it notifies the user that data may have been lost. The data updates from storage controller 14 cannot be issued because storage controller 12 now owns and has been writing to the drive. This data will be purged from the write cache in storage controller 14.

Referring again to decision 52, if no other storage controller is currently listed in Controller Level DOT 36 as the owner of the logical drive, then DOT Manager 30 records for the logical drive the world wide ID of storage controller 12 and sets the "in use" bit in the Controller Level DOT 36 (step 56). Next, DOT Manager 36 determines if storage controller 12 is in "write through" mode for this logical drive, i.e. if each item of host data for this logical drive is written through storage controller 12 into the storage device without being cached in write cache 22 (decision 58). This determination is specified in a configuration file or changed later by a systems administrator. If the logical drive is in "write back" mode and not "write through" mode, then DOT Manager 30 sets the "dirty" bit in Controller Level DOT 36 for this logical drive to indicate that the host data is written to write cache 22 before being written to the storage device (step 60). Next, the Controller Level DOT 36 updates the Drive Level DOT 27 in the storage device to indicate (by world wide ID) that storage controller 12 is the current owner of the logical drive, that the logical drive is "in use" and whether the host data is potentially "dirty" (step 62). Next, DOT Manger 30 determines from the configuration file if the write command is for a logical drive used/shared by one or more other storage controllers. If so, then DOT Manager 30 notifies these other storage controllers that storage controller 12 is the current owner (step 64). In response, the DOT Managers within these other storage controllers update their respective Controller Level DOTs to indicate that storage controller 12 is the current owner of the subject logical drive, sets the "in use" bit and also sets the "dirty" bit if appropriate.

DOT Manager 22 reports to I/O Manager 16 that it can proceed with processing the write command (step 66). If storage controller 12 is set in the write back mode, then host data is not immediately written to the logical drive but is instead written to the write cache 22. Storage controller 12 will remain the "owner" of the logical drive until an event occurs that prompts storage controller 12 to relinquish its ownership. In the illustrated embodiment, storage controller 12 will not automatically relinquish its ownership after it completes the write commands provided by a host. The following are examples of events that cause storage controller 12 to relinquish its ownership of the logical drive: (a) storage controller 12 shuts down (during normal operation), (b) Cluster Resource Manager program 17 advises storage controller 12 that it should clear its ownership of the logical drive (during normal operation), and (c) storage controller 12 fails (abnormally) and another storage controller wants to write to this logical drive.

Figure 3:
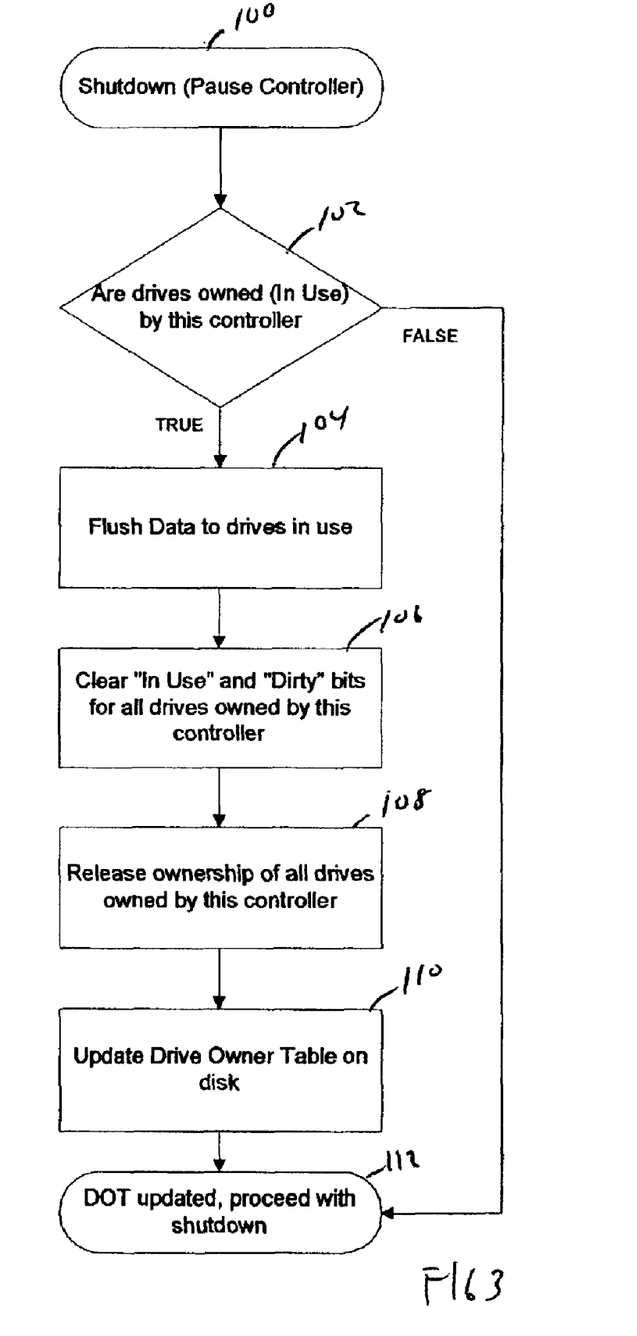
FIG. 3 is flow chart illustrating processing by each storage controller of FIG. 1 of a controller shutdown, according to the present invention.

A storage controller can also be shut down "normally" by a systems administrator or a host during repair or replacement or when no longer needed. Processing of the shut down is illustrated in FIG. 3. When the systems administrator requests a shut down of storage controller 12, a host interface function notifies DOT Manager 30 (step 100). In response, DOT Manager 30 reads Controller Level DOT 36 to determine which logical drives are currently owned by storage controller 12 (decision 102). If there are any such logical drives, then DOT Manager 30 instructs I/O Manager 16 to "flush" write cache 22, i.e. write any data currently stored in write cache 22 intended for such logical drives to such logical drives (step 104). After receiving an indication from I/O Manager 16 that the write cache 22 has been flushed, DOT Manager 30 clears the "in use" and "dirty" bits in Controller Level DOT 36 for all logical drives owned by storage controller 12. Next, DOT Manager 30 deletes its world wide ID from Controller Level DOT for all logical drives and notifies the other storage controllers which share these logical drives to delete the entry for storage controller 12 as the owner of these logical drives (step 108). Next, DOT Manager 30 deletes the owner, "in-use" and "dirty" entries for storage controller 12 in Drive Level DOT 27 and any other Drive Level DOTs where it appears (step 110). Finally, DOT Manager 30 notifies the host interface function that its shut down processing is complete (step 112), so that the other functions with storage controller 12 can proceed with their shut down processing.

In normal operation, the host which issued the write command to storage controller 12 will eventually end its session with storage controller 12. When this occurs, the host will issue a shut down to the storage controller 12. The storage controller will respond as described in FIG. 3.

Figure 4:
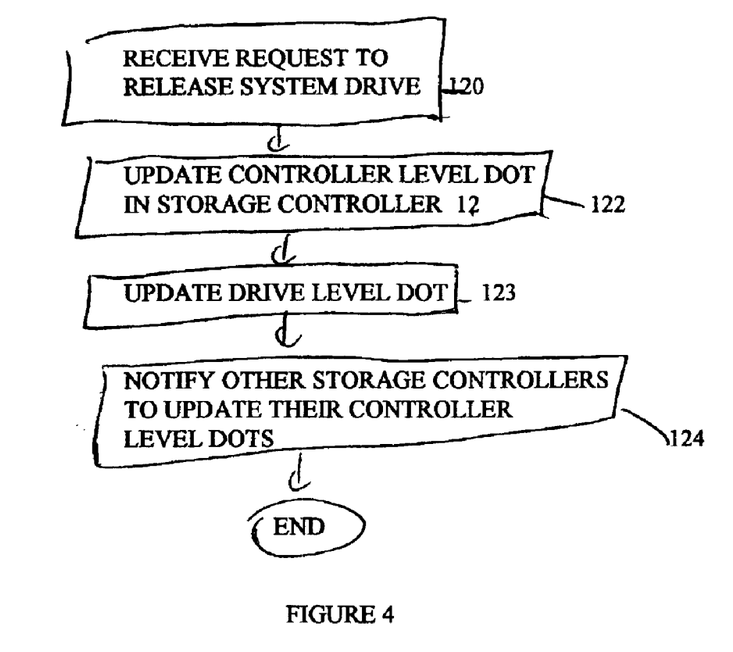
FIG. 4 is a flow chart illustrating processing by each storage controller of FIG. 1 to release a logical drive, according to the present invention.

A logical drive can also be released "normally" by the Cluster Resource Manager program for work load balancing, maintenance or other reasons. When a request is made to storage controller 12 to release a logical drive, the I/O Manager 16 flushes its write cache 22 of all data destined for this logical drive. As illustrated in FIG. 4, after this flush operation, I./O Manager 16 notifies DOT Manager 30 (step 120) which updates the Controller Level DOT 36 to clear the "in use" and "dirty" bits for the logical drive and delete the world wide ID of storage controller 12 as owner of the logical drive (step 122). DOT Manager 30 likewise clears the Drive Level DOTs for this configuration group (step 123). Next, DOT Manager 30 notifies the other storage controller(s), if any, which share access to these logical drives to delete the world wide ID of storage controller 12 as the owner of these logical drives and the corresponding "in use" bits and "dirty" bits if any (step 124).

Figure 5:
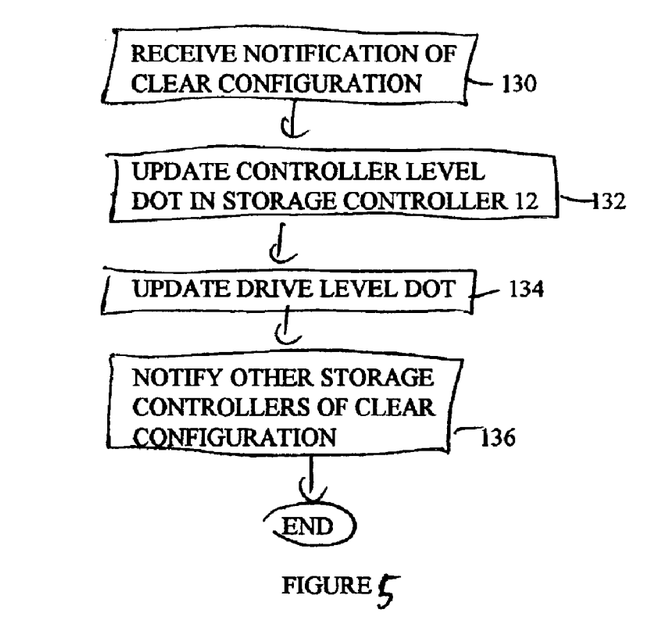
FIG. 5 is a flow chart illustrating processing by each storage controller of FIG. 1 to clear configuration, according to the present invention.

Storage controller 12 also supports a "Clear Configuration" command by a systems administrator as illustrated in FIG. 5. This command will eliminate all logical drives previously accessible by the storage controller. (The physical drives remain, but their logical reference is eliminated.) Upon receipt of the clear configuration command, the I/O Manager 16 purges its write cache 22 and then notifies DOT Manager 30 (step 130). In response, the DOT Manager 30 clears the "in use" and "dirty" bits in the Controller Level DOT 36 for each logical drive that is part of the configuration group (step 132). Also, the DOT Manager 30 deletes the world wide ID of storage controller 12 for each of these logical drives (step 132). Next, DOT Manager 30 updates the Drive Level DOT(s) for the logical drives in the configuration group (step 134). If any of the logical drives in the configuration group is shared by another storage controller, then DOT Manager 30 notifies these other storage controller(s) to delete the world wide ID of storage controller 12 and the corresponding "in use" bits and "dirty" bits if any (step 136).

Figure 6:
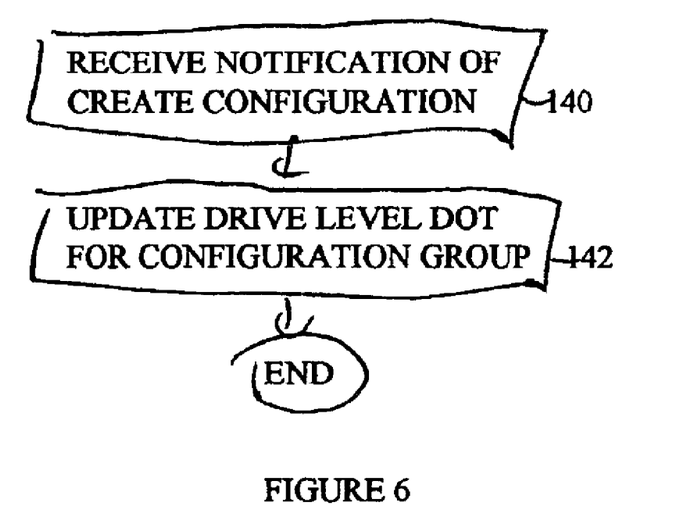
FIG. 6 is a flow chart illustrating processing by each storage controller of FIG. 1 to create configuration, according to the present invention.

Storage controller 12 also supports a "Create Configuration" command by a systems administrator to create new logical drives for a storage controller. This is illustrated in FIG. 6. In response, the DOT Manager 30 initializes the Drive Level DOT for the configuration group (step 140). Then, DOT Manager 30 clears any world wide ID of an owner, "in use" bit and "dirty" bit in the Drive Level DOT (step 142). Typically, there will not be any such entries, although in some scenarios there are residual entries. A residual entry could exist if a physical drive was off-line during the foregoing clear operation, but was later used when creating a new configuration.

Figure 7:
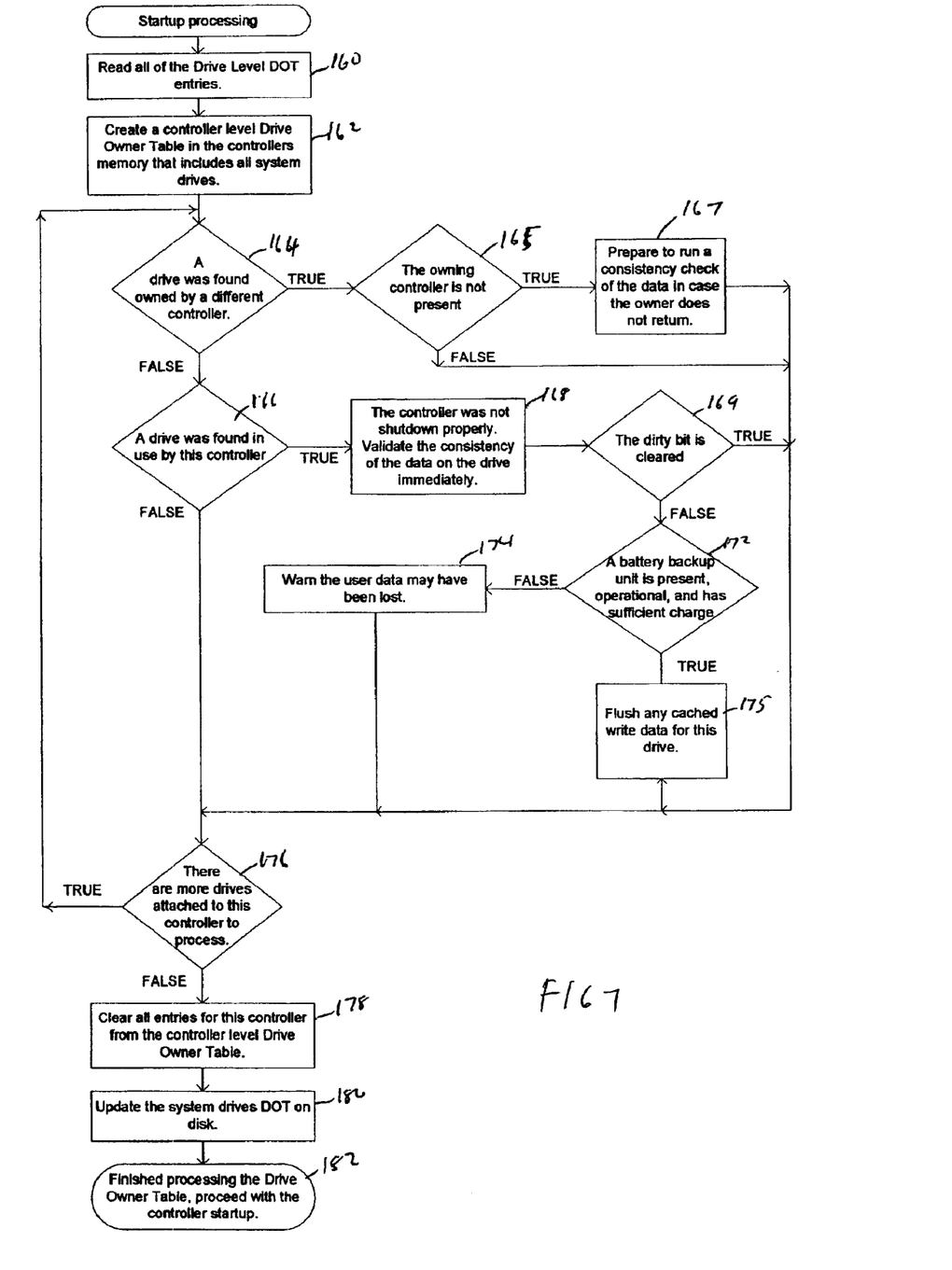
FIG. 7 is a flow chart illustrating processing by each storage controller of FIG. 1 of a Drive Owner Table during rebooting, according to the present invention

In keeping with the objects of the present invention, system 10 also detects data integrity problems when the physical drive or drives corresponding to a configuration group are transported before all updates intended to be written to a logical drive have been written from a storage controller cache to the logical drive(s). This can occur if the storage controller is shut down abnormally, without its write cache being flushed. This can also occur if the disk drive or drives are removed from the system 10 without being normally "released". Typically, when a disk drive is transported, the new system that includes this disk drive is reconfigured. As part of the reconfiguration, the storage controllers in this configuration are shut down and rebooted/restarted. FIG. 7 illustrates the rebooting process of each storage controller, which rebooting process detects data integrity problems on the disks in the configured system. As part of the rebooting process, DOT Manager 30 reads all the Drive Level DOTs of the drives accessible by storage controller 12 (step 160). Next, DOT Manager 30 creates Controller Level DOT 36 from the owner and status (i.e. "in use" and "dirty") information obtained from the Drive Level DOTs (step 162) of all the drives accessible by storage controller 12. Thus, controller Level DOT 36 will include an entry for each storage controller which shares access to the same configuration groups as storage controller 12. The entry will include the world wide ID, "in use" and "dirty" bits, if any, of these storage controllers. At this time, there should be no logical drives owned by storage controller 12 because storage controller 12 is just coming up.

Next, DOT Manager 30 determines from the Drive Level DOTs if there are any logical drives owned by a storage controller other than storage controller 12 (decision 164). If so, then DOT Manager 30 determines if the owning storage controller is currently in the configuration group, i.e. currently has access to the logical drive. If not, then DOT Manager 30 prepares to run a parity check. That is, the parity check is queued up, but does not yet start. If the owner does not return (up and running) to the configuration group after a predefined time limit, then DOT Manager 30 runs the parity check and any invalid parity data is corrected by known techniques commensurate with the RAID level. For example, under some RAID levels there are sufficient parity bits to correct data and under other RAID levels there are duplicate copies of some data. If the original owner of the logical drive subsequently rejoins the cluster, any data in that storage controller's cache is purged.

Referring again to decision 164, if there were no logical drives owned by another storage controller, then DOT Manager 30 checks if any of the logical drives lists storage controller 12 as the owner. If the DOT Manager 30 discovers from the Drive Level DOT(s) a logical drive that is owned by storage controller 12 (decision 166), this indicates that storage controller 12 was not shut down normally. In which case, DOT Manager 30 validates the consistency of the data on the logical drive by checking parity and any invalid parity data is corrected in the same manner as explained above.

Then, DOT Manager 30 checks if the "dirty" bit is cleared (decision 169). If so, then cache controller 12 was in the write through mode when the abnormal shut down occurred, and there should not be data in its cache 22 yet to be written to the logical drive. So, the data in the logical drive can be trusted. However, if the "dirty" bit is set (decision 169), then there is the chance that data was in cache 22 and lost before being written to the logical drive. So, DOT Manager 30 determines whether a battery backup unit is present, operational and has sufficient charge (decision 172). If so, then DOT Manager 30 presumes that the cache contents were preserved after the abnormal shut down. So, if there are no updates currently in the cache, then there were no updates yet to be written to the logical drive before the abnormal shut down. However, if there are updates currently in the cache, then they are presumed to be valid. So, DOT Manager 30 instructs the I/O Manager 16 to write any updates in the cache out to the logical drive (step 175). However, if there is no battery backup, then DOT Manager 30 warns the user that there may have been data in the cache that was not written out to the logical drive and was lost (step 174).

The foregoing steps 164–175 are repeated for any other logical drives which indicate an owner at the time of boot-up by storage controller 12. After the repetition of steps 164–175 as needed, DOT Manager 30 clears all entries for storage controller 12 from the Controller Level DOT 36 (step 178). Next, DOT Manager 30 updates the Drive Level DOTs for all logical drives in the configuration group to delete any world wide IDs for storage controller 12 and corresponding "in use" bits and "dirty" bits (step 180). Finally, DOT Manager 30 reports to the I/O Manager 16 that it can begin processing any I/O operations from a host (step 182).

Based on the foregoing, a system and method have been disclosed for detecting data integrity problems in a disk or group of disks that has been transported. However, numerous modifications and substitutions can be made without deviating from the scope of the present invention. For example, there can be different device and interface types, number of controllers, number of hosts and number of drives. Therefore, the present invention has been disclosed by way of illustration and not limitation, and reference should be made to the following claims to determine the scope of the present invention.

What is claimed is:

1. A method for managing storage, said method comprising the steps of:
    a first storage controller receiving a write command from a host computer to write host data to a disk, and in response, writing said host data into a cache memory in said first storage controller, and before said host data is written from said cache memory to said disk or a portion of said disk, recording on said disk or the disk portion an identity of said first storage controller as a current user of said disk or said disk portion and an indication that said first storage controller is operating in a mode in which it stores data in a cache before writing the data to said disk or said disk portion;
    subsequently shutting down said first storage controller such said host data in said cache memory is not written to said disk or said disk portion and the record of the identity of said first storage controller and the indication that said storage controller is operating in said mode are not cleared; and
    a second storage controller subsequently accessing said disk or said disk portion and reading said record to learn that said first storage controller was using said disk or said disk portion and operating in said mode before the shutdown; and wherein in response to said reading step, said second storage controller not using stale data in said disk or disk portion for which said host data is an update, and further comprising the steps of said first storage controller being reactivated and writing said host data from said cache memory to said disk or said disk portion, and then said second storage controller using said host data from said disk or said disk portion.

2. A method as set forth in claim 1 wherein said indication of said mode is independent of contents of said cache memory.

3. A method as set forth in claim 1 wherein said disk or said disk portion is a logical disk drive portion of said disk.

4. A method as set forth in claim 1 further comprising the step of:
    recording in said first storage controller, before said shutdown, a record that said storage controller is operating in said mode.

5. A system for storing data, said system comprising:
    a first storage controller including a cache memory and means for receiving a write request from a host computer to write host data to a disk, and in response, writing said host data into said cache memory;
    means, active before said host data is written from said cache memory to said disk or a portion of said disk, for recording on said disk or the disk portion an identity of said first storage controller as a current user of said disk or said disk portion and an indication that said first storage controller is operating in a mode in which it stores data in a cache before writing the data to said disk or said disk portion;
    means for subsequently shutting down said first storage controller such said host data in said cache memory is not written to said disk or said disk portion and the record of the identity of said first storage controller and the indication that said first storage controller is operating in said mode are not cleared; and
    a second storage controller including means for subsequently accessing said disk or said disk portion and reading said record to learn that said first storage controller was using said disk or said disk portion and operating in said mode before the shutdown; and
    wherein said second storage controller includes means, responsive to said reading of said record, for preventing said second storage controller from using stale data from said disk or disk portion for which said host data is an update, and after said host data is written to said disk or said disk portion, for allowing said second storage controller to use said host data from said disk or disk portion.

6. A system as set forth in claim 5 wherein said indication of said mode is independent of contents of said cache memory.

7. A system as set forth in claim 5 wherein said disk or said disk portion is a logical disk drive portion of said disk.

8. A system as set forth in claim 5 further comprising means for recording in said first storage controller, before said shutdown, a record that said storage controller is operating in said mode.

9. A computer program product for managing storage of data, said computer program product comprising:
    a computer readable medium;
    first program instructions for execution in a first storage controller having a cache memory to receive a write request from a host computer to write host data to a disk, and in response, write said host data into said cache memory;

second program instructions for execution in said first storage controller, activated before said host data is written from said cache memory to said disk or a portion of said disk, to initiate recording on said disk or the disk portion an identity of said first storage controller as a current user of said disk or said disk portion and an indication that said first storage controller is operating in a mode in which it stores data in a cache before writing the data to said disk or said disk portion;

third program instructions for execution in said first storage controller to respond to subsequent, abnormal shut down of said first storage controller such said host data in said cache memory is not written to said disk or said disk portion and the record of the identity of said first storage controller and the indication that said first storage controller is operating in said mode are not cleared; and fourth program instructions for execution in a second storage controller to subsequently access said disk or said disk portion and read said record to learn that said first storage controller was using said disk or said disk portion and operating in said mode before the shutdown; and wherein said fourth program instructions respond to said reading of said record by preventing said second storage controller from using stale data from said disk or disk portion for which said host data is an update, and after said host data is written to said disk or said disk portion, by allowing said second storage controller to use said host data from said disk or disk portion; and said first, second, third and fourth program instructions are recorded on said medium.

* * * * *